United States Patent Office 3,230,223
Patented Jan. 18, 1966

3,230,223
PIPERAZINE DERIVATIVES
Jean Gaston Baget, Sceaux, France, and Pierre Sarret,
deceased, late of Fontenay-sous-Bois, France, by
Jacques Maurice Thouvenot, legal representative, Fontenay-sous-Bois, France, assignors to Rhone-Poulenc
S.A., Paris, France, a corporation of France
No Drawing. Filed Mar. 23, 1964, Ser. No. 380,722
Claims priority, application France, Mar. 25, 1963,
929,114; Feb. 11, 1964, 963,350
15 Claims. (Cl. 260—268)

This invention relates to new therapeutically useful quinoline derivatives, to processes for their preparation and pharmaceutical compositions containing them.

According to the present invention, there are provided the new 4-aminoquinoline derivatives of the general formula:

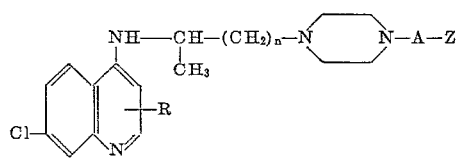

I wherein R represents a hydrogen atom or an alkyl group containing at most 4 carbon atoms in the 2- or 3-position of the quinoline nucleus, $n$ represents an integer from 1 to 4 inclusive, A represents a saturated, divalent, straight- or branched-chain hydrocarbon group containing 2 to 6 carbon atoms, and Z represents an amino, monoalkylamino, dialkylamino or N-alkoxycarbonyl-N-alkylamino group, or a nitrogen-containing heterocyclic group attached through a nitrogen atom to the group A, and their acid addition salts. By "nitrogen containing heterocyclic group" as used in this specification and accompanying claims is meant a group selected from the class consisting of 1-aziridinyl, 1-azetdinyl, 1-pyrrolidinyl, piperidino, morpholino, hexamethyleneimino, 1-piperazinyl, 1-piperazinly substituted in the 4-position by an alkyl, alkanoyl, alkoxycarbonyl, carbamoyl, N-monoalkylcarbamoyl or N,N-dialkylcarbamoyl group, the alkyl, alkanoyl and alkoxy radicals containing at most 4 carbon atoms, 2-isoindolinyl and 1,1,2,3,4-tetrahydroquinolyl groups, and such groups carrying on one or more of its carbon atoms alkyl or aryl substituents or oxygen atoms, the alkyl substituents being more particularly alkyl groups containing 1 to 4 carbon atoms and the aryl substituents being more particularly phenyl, halogenophenyl or alkylphenyl groups.

When Z represents a mono or di-alkylamino group, the alkyl radical(s) may be straight- or branched-chain and contain up to 12 carbon atoms but preferably at most 4 carbon atoms; the group Z may therefore be an amino group substituted by one or two alkyl groups such as methyl, ethyl, n-propyl, isopropyl, n-butyl, isobutyl, n-hexyl, n-octyl or dodecyl. When Z represents an N-alkoxycarbonyl-N-alkylamino group, the alkyl and alkoxy radicals preferably contain at most 4 carbon atoms.

The 4-aminoquinoline derivatives of Formula I can exist in stereoisomeric forms. The invention includes all stereoisomeric forms of the compounds and also acid salts thereof.

According to a feature of the present invention, the 4-aminoquinoline derivatives of Formula I are prepared by the process which comprises reacting a piperazine derivative of the general formula:

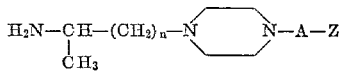

II (wherein $n$, A and Z are as hereinbefore defined) with a quinoline derivative of the general formula:

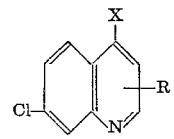

III wherein X represents a reactive atom or group such as a chlorine atom or a phenoxy group, and R is as hereinbefore defined. The reaction may be effected with or without an inert organic solvent medium in the presence or absence of a condensing agent. Preferably it is carried out by heating the reactants in an inert organic solvent having a high boiling point, such as an aromatic hydrocarbon (e.g. xylene or toluene), an amide (e.g. dimethylformamide) or phenol, at a temperature between 100° and 250° C.

According to a further feature of the invention, the 4-aminoquinoline derivatives of Formula I are prepared by the process which comprises reacting a compound of the formula Y—A—Z (wherein Y represents the acid residue of a reactive ester such as a halogen atom or a sulphuric or sulphonic ester residue, in particular a methanesulphonyloxy or toluene-p-sulphonyloxy group, and A and Z are as hereinbefore defined) with a quinoline derivative of the general formula:

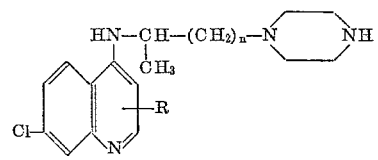

IV wherein R and $n$ are as hereinbefore defined. The reaction is advantageously effected in an inert aromatic hydrocarbon, amide, alcohol (e.g. ethanol) or ketone (e.g. methyl ethyl ketone), solvent medium in the presence of an acid-binding agent, preferably an alkali metal derivative, for example sodium carbonate, or a tertiary amine, for example triethylamine. The reaction is conveniently carried out at the boiling temperature of the solvent employed.

According to a still further feature of the invention, the 4-aminoquinoline derivatives of Formula I are prepared by the process which comprises reacting a piperazine derivative of the general formula:

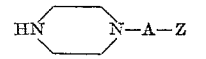

V (wherein A and Z are as hereinbefore defined) with a quinoline derivative of the general formula:

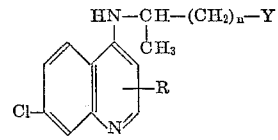

VI wherein R, $n$ and Y are as hereinbefore defined. The reaction is advantageously effected in an inert organic solvent medium such as an aromatic hydrocarbon, alcohol or ketone, preferably at the boiling temperature of the solvent in the presence or absence of an acid-binding agent.

It is within the scope of the present invention to convert by methods known per se a product of Formula I obtained by any of the foregoing processes into another compound conforming to the same formula. Thus, when the product is one in which Z is a 1-piperazinyl group the compound may be reacted with an alkali metal cyanate, an alkyl isocyanate, urea or a carbamoyl halide (preferably chloride) to yield a 4-aminoquinoline derivative of Formula I in which Z is a 4-carbamoyl-1-piperazinyl, 4-N-monoalkyl-carbamoyl-1-piperazinyl or 4-N,N-dialkyl-carbamoyl-1-piperazinyl group. When the product is one in which Z is an N-alkoxycarbonyl-N-alkylamino, 4-alkanoyl-1-piperazinyl, or 1,3-dioxo-2-isoindolinyl (i.e. phthalimido) group, the compound may be hydrolysed by methods known per se to yield 4-aminoquinoline derivatives of Formula I in which Z is a monoalkylamino, 1-piperazinyl or amino group, respectively.

The 4-aminoquinoline derivatives of Formula I may be converted by methods known per se into acid addition salts. Thus, the acid addition salts may be obtained by the action of an acid on the quinoline derivative in an appropriate solvent such as an alcohol, a ketone, or water. The acid addition salt which is formed is precipitated, if necessary after concentration of its solution, and is separated by filtration or decantation.

By the term "methods known per se" is meant methods heretofore used or described in the chemical literature.

The new 4-aminoquinoline derivatives of the present invention and their non-toxic acid addition salts possess useful chemotherapeutic properties. They are, in particular, useful an antimalarials, and also have utility as anthelmintics and amoebicides. Preferred compounds are those in which R represents a hydrogen atom and $n$ represents 1. Of that class those in which A represents a hydrocarbon group of 2, 3, 4 or 6 carbon atoms are of outstanding interest, especially those compounds in which Z represents a piperidyl group. Of importance are 1-[2 - (7-chloro-4-quinolyl)aminopropyl]-4-[2 - (1-piperidinyl)ethyl]piperazine, 1-[2-(7-chloro-4-quinolyl)aminopropyl]-4-(3-dimethylamino - 2-methylpropyl)piperazine, 1-[2-(7-chloro-4-quinolyl) - aminopropyl]-4-[2-(1-piperidinyl)propyl]piperazine, 1-[2 - (7-chloro - 4-quinolyl) aminopropyl] - 4-[3-(1-piperidinyl)propyl]piperazine, 1-[2-(7-chloro - 4-quinolyl)aminopropyl]-4 - [6-(1-piperidinyl)hexyl]piperazine, 1-[2-(7-chloro-4-quinolyl)aminopropyl]-4 - (2-di-isobutylaminoethyl)-piperazine, 1-[2-(7-chloro-4 - quinolyl)aminopropyl]-4 - (2-hexamethyleneiminoethyl)piperazine and 1-[2 - (7-chloro - 4-quinolyl)aminopropyl]-4-[2-(4-phenyl - 1-piperidinyl)ethyl]piperazine—especially the first-mentioned compound which possesses outstanding antimalarial activity—and non-toxic acid addition salts of the aforesaid bases.

For therapeutic purposes, the bases of general Formula I are employed as such or in the form of non-toxic acid addition salts, i.e. salts containing anions which are relatively innocuous to the animal organism in therapeutic doses of the salts (such as hydrochlorides and other hydrohalides, phosphates, nitrates, sulphates, acetates, propionates, succinates, benzoates, fumarates, maleates, theophylline-acetates, salicylates, phenolphthalinates, methylene-bis-β-hydroxynaphthoates (also known as embonates), resorcylates, gentisates and p-hydroxyisophthalates) so that the beneficial physiological properties inherent in the bases are not vitiated by side-effects ascribable to the anions.

The following examples illustrate the invention.

*Example I*

A mixture of 1-[2-(1-piperidinyl)ethyl]-4-(2-aminopropyl)-piperazine (42 g.), 4,7-dichloroquinoline (33.6 g.) and phenol (47 g.) is heated for 2 hours at 150° C. and, after cooling, poured into a mixture of distilled water (500 cc.) and sodium hydroxide solution ($d$=1.33; 70 cc.). The precipitated base is extracted with methylene chloride (500 cc.) and the extract obtained treated with a mixture of distilled water (500 cc.) and concentrated hydrochloric acid ($d$=1.19; 57 cc.). The layers are separated by decantation, the organic layer discarded, and decolourising charcoal (5 g.) added to the aqueous solution which is then filtered. The base is reprecipitated by the addition of sodium hydroxide solution ($d$=1.33; 80 cc.) and extracted with methylene chloride (500 cc.).

The extract is dried over anhydrous sodium sulphate (30 g.), filtered, and the solvent removed on a water-bath. Acetonitrile (200 cc.) is added to the oily extract obtained, the base crystallises and is collected, washed with acetonitrile (50 cc.), recrystallised from cyclohexane (300 cc.), collected, washed with cyclohexane (30 cc.) and dried at 60° C./0.1 mm. Hg for 20 hours, giving 1-[2-(7-chloro-4 - quinolyl)aminopropyl] - 4-[2 - (1-piperidinyl)ethyl]piperazine (49.5 g.), M.P. 135° C.

The 1-[2-(1-piperidinyl)ethyl]-4 - (2-aminopropyl)piperazine used as starting material in this preparation is prepared from 1-[2-(1-piperidinyl)ethyl]-4-(2-oxopropyl)piperazine (80 g.), itself obtained from 1-[2-(1-piperidinyl)ethyl]piperazine (70 g.). This latter compound is obtained by the condensation of 1-(2-chloroethyl)piperidine hydrochloride (93 g.) with anhydrous piperazine (161 g.).

*Example II*

A mixture of 1-[2-(7-chloro-4-quinolyl)aminopropyl] piperazine (30.5 g.), 1-(2-chloroethyl)piperidine hydrochloride (20.2 g.), anhydrous sodium carbonate (26.5 g.), and dry sodium iodide (15 g.) in ethanol (200 cc.) is heated under reflux, with stirring, for 12 hours. After cooling, the mineral salts are removed and washed with ethanol (100 cc.). The washings are combined with the filtrate and the solvent removed under reduced pressure (15 mm. Hg) on a water-bath, the temperature not being allowed to exceed 50°C. The residue obtained is treated with distilled water (100 cc.) and the insoluble oil extracted with methylene chloride (250 cc.). The extract is treated with anhydrous sodium sulphate (10 g.), filtered and the solvent removed under reduced pressure (15 mm. Hg) on a water-bath, the temperature not being allowed to exceed 40° C. The dry oily residue is taken up in acetonitrile (100 cc.), heated to boiling to obtain solution and then cooled to crystallise the product which is collected, washed with acetonitrile (50 cc.), recrystallised without drying from acetonitrile (200 cc.), collected, washed with acetonitrile (25 cc.) and dried at 60° C./0.1 mm. Hg for 8 hours, giving 1-[2-(7-chloro-4-quinolyl)aminopropyl]-4 - [2-(1-piperidinyl)ethyl]-piperazine (25 g.), M.P. 135° C., identical to the product obtained in Example I.

*Example III*

A mixture of 1-[2-(7-chloro-4-quinolyl)aminopropyl] piperazine (70 g.), 1-chloro-3-dimethylaminopropane hydrochlorine (41.2 g.), pure anhydrous sodium carbonate (106 g.), sodium iodide (34.5 g.) and methyl ethyl ketone (800 cc.) is heated under reflux, with stirring, for 8 hours. The mineral salts are removed and the solvent removed on a water-bath. The residue obtained is treated with distilled water (500 cc.) and the base extracted with methylene chloride (500 cc.). After drying the solution obtained, the solvent is removed on a water-bath and the residue obtained taken up in acetonitrile (200 cc.) and heated to boiling point to achieve solution. On cooling, a product crystallises which is collected and washed with acetonitrile (40 cc.). The damp product (45 g.) is dissolved in methyl ethyl ketone (250 cc.), decolourising charcoal (1 g.) added, the mixture is filtered and a portion of solvent (about 100 cc.) removed on a water-bath. On cooling, the base crystallises and is separated, washed with di-isopropyl ether (20 cc.) and dried at 40° C./0.1 mm. Hg for 20 hours, giving 1-[2-(7-chloro-4-quinolyl) aminopropyl]-4 - (3-dimethylamino-1 - propyl)piperazine (20 g.), M.P. 102° C.

*Examples IV*

1-[4-(7-chloro-4-quinolyl)amino - 1-pentyl]piperazine (60 g.) and 2-chloromethyl-1-dimethylaminopropane (27 g.) in toluene (1500 cc.) are heated under reflux for 6 hours and, after cooling a solution of methanesulphonic acid (60 cc.) in distilled water (1 litre) is added to the solution, the layers separated by decantation and the toluene solution discarded. Sodium hydroxide solution ($d=1.33$; 100 cc.) is added to the aqueous solution which is then extracted with methyl ethyl ketone (600 cc.). By chromatographing the extract through a solumn (37 mm. diameter, 55 cm. height) containing alumina (500 g.) and eluting with methyl ethyl ketone (1 litre), a crude base (52 g.) is obtained by concentration of the first elution fraction (600 cc.). This crude base is treated with ethyl acetate (500 cc.), insoluble material separated and picric acid (82 g.) in ethyl acetate (250 cc.) added to the solution. The gummy picrate is collected after 24 hours, washed with di-isopropyl ether (500 cc.) and dried at 20° C./0.2 mm. Hg for 20 hours. The product obtained (104 g.) is recrystallised from benzyl alcohol (500 cc.), collected, washed with ethanol (400 cc.) and dried at 40° C./20 mm. Hg for 20 hours, giving the purified picrate (75 g.), M.P. 260° C. (with decomposition).

The above picrate is decomposed with a solution of concentrated hydrochloric acid ($d=1.19$; 100 cc.) and distilled water (100 cc.), the picric acid formed being extracted with benzene (1500 cc. total). The hydrochloric acid and a portion of the water (about 50 cc.) are removed under reduced pressure (20 mm. Hg). Sodium hydroxide solution ($d=1.33$; 30 cc.) is then added and the base which precipitates extracted with methyl ethyl ketone (450 cc.). Maleic acid (20.2 g.) in methyl ethyl ketone (200 cc.) is added to the solution of the base. The gummy precipitate obtained is solidified with ethyl acetate (500 cc.), collected, and washed with ethyl acetate (50 cc.) giving, after drying, at 40° C./20 mm. Hg for 4 hours, the maleate (43 g.). Recrystallising from ethanol (250 cc.), separating, washing with ethanol (50 cc.) and drying at 40° C./20 mm. Hg for 20 hours, gives 1-[4-(7-chloro-4-quinolyl)amino-1-pentyl]-4-(3-dimethylamino-2-methyl-1-propyl)piperazine tetramaleate (21 g.), M.P. about 125° C.

*Example V*

A mixture of 4-(2-chloro-1-methylethyl)amino-7-chloroquinoline (76.5 g.), 1-(2-dimethylamino-1-propyl)piperazine (51.4 g.), sodium iodide (45 g.), triethylamine (30.3 g.) and methyl ethyl ketone (975 cc.) is heated under reflux for 7 hours. After cooling, distilled water (400 cc.) is added and the mixture extracted with methyl ethyl ketone (200 cc.). This extraction solution is dried over anhydrous sodium sulphate (20 g.), filtered and the solvent removed on a water-bath. The dry extract obtained is extracted 6 times with methylene chloride (1500 cc. total), insoluble material removed and the solvent removed on a water-bath. Hexane (250 cc.) is added to the oil obtained (100 g.), the base solidifies and is collected and washed with hexane (100 cc.), giving the base (82 g.), M.P. 106°–108° C. This base is dissolved in methylene chloride (820 cc.) and chromatographed through alumina (820 g.) in a column (48 mm. diameter; 46 cm. height) by eluting with methylene chloride (3 litres). The solvent of the first elution fraction (1500 cc.) is removed and the residue taken up in acetonitrile (70 cc.). The base crystallises and is collected, washed with acetonitrile (10 cc.) and dried at 20° C./0.2 mm. Hg for 16 hours. This base (23.5 g.) is recrystallised from acetonitrile (100 cc.), collected, washed with acetonitrile (10 cc.) and dried at 40° C./0.2 mm. Hg for 16 hours giving 1-[2-(7-chloro-4-quinolyl)aminopropyl] - 4 - (2-dimethylaminopropyl)piperazine (17.5 g.), M.P. 122°–124° C.

*Example VI*

A mixture of 4-(2-chloro-1-methylethyl)amino-7-chloroquinoline (45.5 g.), 1-(3-dimethylamino-2-methylpropyl)piperazine (33 g.), pure dry sodium iodide (26.8 g.), triethylamine (18 g.) and methyl ethyl ketone (600 cc.) is heated under reflux for 7 hours. After cooling, distilled water (250 cc.) is added and the base extracted with methyl ethyl ketone (150 cc.). The extract is dried over sodium sulphate (10 g.), filtered, and the solvent removed on a water-bath. Distilled water (250 cc.) and methylene chloride (250 cc.) are added to the dry residue obtained, made alkaline with sodium hydroxide solution ($d=1.33$; 50 cc.) and the precipitated base extracted with methylene chloride (200 cc.). The solution is then chromatographed through alumina (700 g.) in a column (48 mm. diameter; 40 cm. height) and eluted with methylene chloride (2 litres). The first elution fraction (500 cc.) is evaporated on a water-bath and acetonitrile (50 cc.) added to the dry residue obtained. The base crystallises and is collected and washed with acetonitrile (20 cc.). The product obtained is recrystallised, without drying, from acetonitrile (50 cc.), separated, washed with acetonitrile (20 cc.) and dried at 20° C./0.2 mm. Hg for 16 hours, giving 1-[2-(7-chloro-4-quinolyl)aminopropyl] - 4 - (3-dimethylamino-2-methylpropyl)piperazine (14 g.), M.P. 100–102° C.

*Example VII*

A mixture of 1-[2-(7-chloro-4-quinolyl)aminopropyl]piperazine (39.6 g.), 1-(2-chloroethyl)pyrrolidine (20 g.), triethylamine (13.1 g.) and toluene (320 cc.) is heated under reflux for 6 hours. After cooling, concentrated hydrochloric acid ($d=1.19$; 50 cc.) and distilled water (250 cc.) are added to the solution, stirred and left to stand in order to allow the phases to separate. The toluene solution is discarded, sodium hydroxide solution ($d=1.33$; 100 cc.) added to the aqueous solution and the base extracted with methylene chloride (450 cc.). The solvent is removed on a water-bath and the dry residue obtained treated with toluene (65 cc.). After stirring for 2 hours, separating and washing with toluene (50 cc.), the base (37 g.), M.P. about 125° C., is obtained. This base is dissolved in methylene chloride (370 cc.) and this solution chromatographed through alumina (400 g.) in a column (47 mm. diameter; 25 cm. height), elution being effected with methylene chloride (1250 cc.). Evaporation of the first elution fraction (1250 cc.), followed by washing with acetonitrile (70 cc.) and recrystallisation from acetonitrile (250 cc.), gives a base (8 g.), M.P. about 160° C. Evaporation of the second elution fraction (290 cc.) and a single washing with acetonitrile (65 cc.) gives a base (9 g.), M.P. about 160° C. The two products are combined and recrystallised from acetonitrile (750 cc.). The product is collected, washed with acetonitrile (60 cc.) and dried at 30° C./0.2 mm. Hg for 15 hours, giving 1-[2-(7-chloro-4-quinolyl)aminopropyl] - 4 - [2-(1-pyrrolidinyl)ethyl]piperazine (10 g.), M.P. 164–166° C.

*Example VIII*

A mixture of 1-[4-(7-chloro-4-quinolyl)amino-1-pentyl]-piperazine (34 g.), 1-(2-chloroethyl)piperidine hydrochloride (19.3 g.), sodium iodide (15 g.) and anhydrous triethylamine (20.9 g.) in methyl ethyl ketone (250 cc.) is heated under reflux, with stirring, for 6 hours. After cooling, insoluble material is filtered off and washed with acetone (100 cc.). The solvents are removed under reduced pressure (20 mm. Hg) on a water-bath, the temperature not being allowed to exceed 50° C. The dry residue obtained is stirred with distilled water (200 cc.) and methylene chloride (500 cc.). After decantation, the organic layer is dried over anhydrous sodium sulphate (50 g.). The dried solution is chromatographed through alumina (300 g.) in a column (37 mm. diameter; 40 cm. height) and eluted with methylene chloride (500 cc.). The solvent is removed on a water-bath and the dry residue taken up in acetonitrile (200 cc.). On cooling, the base crystallises and is collected and dried at 20° C./0.05 mm. Hg for 20 hours, giving 1-[4-(7-chloro-4-quinolyl)amino-1-pentyl] - 4 - [2-(1-piperidinyl)ethyl]piperazine (14 g.), M.P. 116–118° C. This base (13.5 g.) is dissolved in ethanol (250 cc.), concentrated hydrochloric acid ($d=1.19$; 10.5 cc.) added and the mixture left for 2 hours in a refrigerator. The precipitate is collected, washed with ethanol (100 cc.) and dried at 60° C./0.05 mm. Hg for 16 hours, giving 1-[4-(7-chloro-4-quinolyl)amino-1-pentyl] - 4 - [2-(1-piperindinyl)ethyl]-piperazine tetrahydrochloride (13 g.), M.P. about 270° C.

*Example IX*

A mixture of 1-[2-(7-chloro-4-quinolyl)aminopropyl] piperazine (30.5 g.), 1-(2-chloro-1-methylethyl)piperidine hydrochloride (26.5 g.), sodium iodide (15 g.), sodium carbonate (26.5 g.) and ethanol (200 cc.) is heated under reflux, with stirring, for 6 hours. After cooling, the mineral salts are collected and washed with ethanol (100 cc.). The alcohol is removed on a water-bath under reduced pressure (20 mm. Hg), the temperature not being allowed to exceed 50° C. Methylene chloride (300 cc.) is added to the dry residue obtained together with a solution of concentrated hydrochloric acid ($d=1.19$; 30 cc.) in distilled water (200 cc.). The aqueous solution is decanted, decolourising charcoal (5 g.) added and filtered. The filtrate is made alkaline with sodium hydroxide solution ($d=1.33$; 50 cc.) and the free base extracted with methylene chloride (300 cc.). The solvent is removed on a water-bath and the dry residue obtained taken up in acetonitrile (200 cc.). After standing for 6 hours in a refrigerator the product is collected, washed with acetonitrile (25 cc.) followed by ethyl acetate (20 cc.). The damp product is recrystallised from acetonitrile (100 cc.) and dried at 55° C./0.1 mm. Hg for 12 hours, giving 1-[2-(7-chloro-4-quinolyl)amino - propyl]-4-[2-(1-piperidinyl)propyl]piperazine (17 g.), M.P. 101–102° C.

*Example X*

A mixture of 1-[2-(7-chloro-4-quinolyl)aminopropyl] piperazine (30.5 g.), 1-chloro-2-diethylaminoethane hydrochloride (20.6 g.), sodium iodide (15 g.) and anhydrous triethylamine (22.2 g.) in methyl ethyl ketone (250 cc.) is heated under reflux, with stirring, for 12 hours. After cooling, the precipitate is collected and washed with acetone (100 cc.). The combined filtrate and washings are evaporated to dryness under reduced pressure (15 mm. Hg) on a water-bath, the temperature not being allowed to exceed 50° C., and the dry residue obtained taken up in distilled water (200 cc.) and methylene chloride (500 cc.). The phases are separated, the aqueous solution discarded and the solvent removed on a water-bath. The oil obtained is taken up in ethanol (300 cc.) and a solution of anhydrous oxalic acid (35 g.) in ethanol (200 cc.) added. The precipitate of the oxalate is collected, washed with ethanol (100 cc.) and the salt taken up in water (600 cc.). Decolourising charcoal (10 g.) is added to the solution which is then filtered. The filtrate is made alkaline with concentrated ammonium hydroxide solution ($d=0.925$; 100 cc.) and the base which precipitates extracted with methylene chloride (500 cc.). The extract is dried over anhydrous sodium sulphate (20 g.), filtered and the solvent removed on a water-bath. Acetonitrile (50 cc.) is added to the oily residue obtained (25 g.) and left overnight in a refrigerator. The crystalline precipitate is collected and washed with acetonitrile (20 cc.). The damp product is recrystallised from di-isopropyl ether (100 cc.), collected, washed with di-isopropyl ether (25 cc.) and dried at 50° C./0.05 mm. Hg for 16 hours, giving 1-[2-(7-chloro-4-quinolyl)-aminopropyl]-4-(2-diethylaminoethyl)piperazine (10 g.), M.P. 112° C.

*Example XI*

A mixture of 1-[2-(7-chloro-4-quinolyl)aminopropyl] piperazine (10.2 g.), 4 - (2 - methanesulphonyloxyethyl) morpholine (8.2 g.), triethylamine (6.7 g.) and dimethylformamide (50 cc.) is heated at 140° C. for 2 hours. After cooling, the triethylamine hydrochloride formed is separated and washed with dimethylformamide (25 cc.) and the filtrate evaporated under reduced pressure (15 mm. Hg). The dry residue obtained is taken up in distilled water (100 cc.) and pure sodium hydroxide solution ($d=1.33$; 25 cc.) and the base which precipitates extracted with chloroform (250 cc. total). The chloroform solution is then treated with a solution of distilled water (100 cc.) and pure methanesulphonic acid (25 cc.). The phases are separated, the organic layer treated with distilled water (50 cc.) and the phases again separated. The combined aqueous solutions obtained are made alkaline with pure sodium hydroxide solution ($d=1.33$; 50 cc. total) and extracted four times with chloroform (500 cc. total). The chloroform solution is evaporated on a water-bath and the residual oil taken up in acetonitrile (25 cc.). After standing for 15 hours in a refrigerator, the product is collected and washed with acetonitrile (30 cc.), giving, after drying at 20° C./0.2 mm. Hg for 15 hours, the base (6.5 g.), M.P. 122–124° C., which is then recrystallised from boiling acetonitrile (20 cc.). After cooling, the product is collected, washed with acetonitrile (30 cc.) and dried at 20° C./0.2 mm. Hg for 40 hours, to give 1-[2-(7-chloro-4-quinolyl)aminopropyl]-4-[2-(4-morpholinyl)ethyl]piperazine (5.2 g.), M.P. 130–132° C.

The 4-(2-methanesulphonyloxyethyl)morpholine used in this preparation is prepared from 4-(2-hydroxyethyl) morpholine hydrochloride (8.6 g.) and methanesulphonyl chloride (15.5 g.).

*Example XII*

A mixture of 1-[2-(7-chloro-4-quinolyl)aminopropyl] piperazine (45.8 g.), 1-chloro-3-(1-piperidinyl)propane hydrochloride (33 g.), sodium iodide (22.5 g.), sodium carbonate (39.8 g.) and ethanol (300 cc.) is heated under reflux for 7 hours. After cooling, the mineral salts are separated and washed with ethanol (100 cc.). The alcohol of the combined filtrate and washings is removed on a water-bath under reduced pressure (20 mm. Hg) and the dry residue obtained (90 g.) dissolved in boiling acetonitrile (200 cc.). After cooling, the product is collected, washed with acetonitrile (50 cc. total) and dried at 40° C./20 mm. Hg for 40 hours, giving a product (52 g.), M.P. about 118° C. This product is dissolved in benzene (400 cc.), insoluble material removed, charcoal (4 g.) added and filtered. The benzene is removed on a water-bath under reduced pressure (20 mm. Hg) and the dry residue taken up in boiling acetonitrile (200 cc.). After cooling, the product is collected, washed with acetonitrile (60 cc.) and dried at 50° C./20 mm. Hg for 16 hours giving a product (41 g.) which is then dissolved in boiling di-isopropyl ether (600 cc.). After cooling, the product is collected, washed with di-isopropyl ether (200 cc.) and dried at 60° C./0.2 mm. Hg for 6 hours, giving 1-[2-(7-chloro-4-quinolyl)aminopropyl]-4-[3-(1 - piperidinyl)propyl]piperazine (32 g.), M.P. 120–122° C.

*Example XIII*

A mixture of 1-[2-(7-chloro-4-quinolyl)aminopropyl] piperazine (15.3 g.), 1-chloro-6-(1-piperidinyl)hexane hydrochloride (12 g.) and dimethylformamide (75 cc.) is heated at 140° C., with stirring, for 3 hours. The solvent is then removed, the crude oil (49 g.) obtained treated with distilled water (150 cc.) and sodium hydroxide solution ($d=1.33$; 35 cc.) and the base extracted three times with chloroform (250 cc. total). The organic extract is then treated with a solution of pure methanesulphonic acid (44.5 g.) in distilled water (200 cc.). Sodium hydroxide solution ($d=1.33$; 40 cc.) is added to the aqueous solution of the methanesulphonate obtained and the precipitated base extracted three times with methylene chloride (300 cc. total). The organic solution of the base is chromatographed through alumina (220 g.) in a column (2.5 cm. diameter; 55 cm. height) and eluted with methylene chloride (1200 cc.). The solvent is removed on a water-bath and the dry residue obtained taken up in acetonitrile (75 cc.). The base crystallises and is collected, washed with di-isopropyl ether (40 cc.) and dried at 20° C./0.2 mm. Hg for 20 hours, giving the base (11.2 g.), M.P. 94° C.–96° C., which is then dissolved in boiling ethanol (100 cc.) and decolourised by the addition of charcoal (0.5 g.). A solution of aqueous hydrobromic acid ($d=1.49$; 10.2 cc.) in ethanol (40 cc.) is added to the filtered solution and the crystals formed are collected, washed with ethanol (120 cc. total) and dried at 40° C./0.2 mm. Hg for 22 hours, giving 1-[2-(7-chloro-4-quinolyl)aminopropyl]-4-[6-(1 - piperidinyl)hexyl]piperazine tetrahydrobromide (12.05 g.), M.P. about 275° C.

The 1 - chloro-6-(1-piperidinyl)hexane hydrochloride (M.P. 152–154° C.) used as starting material in this preparation is obtained by the chlorination with thionyl chloride (7.2 g.) of 6-1′-piperidinylhexan-1-ol (10.2 g.) (B.P. 98–100° C./0.25 mm. Hg), the latter starting material being prepared from 6-chlorohexan-1-ol (10.9 g.) (B.P. 98–100° C./10 mm. Hg) and piperidine (13.5 g.).

*Example XIV*

A mixture of 1-[2-(7-chloro-4-quinolyl)aminopropyl] piperazine (45.5 g.), 1-methanesulphonyloxy-2-phthalimido-ethane (43 g.), triethylamine (15.1 g.) and dimethylformamide (100 cc.) is heated for 7 hours at 140° C. After cooling, the reaction mixture is poured into distilled water (500 cc.) and extracted with methylene chloride (700 cc.). The organic extract is treated with a solution of hydrochloric acid ($d=1.19$; 38 cc.) and distilled water (400 cc.) and the aqueous solution treated with charcoal (15 g.), filtered and made alkaline with sodium hydroxide solution ($d=1.33$; 50 cc.). The base is extracted with methylene chloride (400 cc.) and the solution obtained chromatographed through alumina (500 g.) in a column (3.5 cm. diameter; 60 cm. height) and eluted with methylene chloride (600 cc. total). The solvent is removed from the combined eluates on a water-bath and the residue obtained dissolved in boiling isopropanol (400 cc.). After cooling, the product is collected, washed with isopropanol (60 cc.) and dried at 70° C./0.1 mm. Hg for 16 hours, giving 1-[2-(7-chloro-4-quinolyl)aminopropyl] - 4 - [2-phthalimidoethyl]piperazine (31 g.), M.P. 172° C.

The 1-methanesulphonyloxy-2-phthalimidoethane (M.P. 139° C.) used as starting material in this preparation is obtained from N-(2-hydroxyethyl)phthalimide (35 g.), M.P. 127° C., prepared according to Soine, Org., Synth. 32, 18 (1952), and methanesulphonyl chloride (42 g.) in the presence of pyridine.

*Example XV*

A mixture of 4-(2-chloro - 1 - methylethyl)amino-7-chloroquinoline (12.8 g.), 1-(2-di-isobutylaminoethyl) piperazine (12.1 g.), anhydrous triethylamine (5.1 g.), sodium iodide (7.5 g.) and methyl ethyl ketone (150 cc.) is heated under reflux for 7 hours. On termination of the heating, the solvent is removed on a water-bath under reduced pressure 20 mm. Hg), distilled water (150 cc.) and sodium hydroxide solution ($d=1.33$; 5 cc.) added and the mixture extracted with methylene chloride (200 cc. total). The organic extract is treated first with distilled water (300 cc.) and then with a solution of pure methanesulphonic acid (19.5 g.) in distilled water (150 cc.). Sodium hydroxide solution ($d=1.33$; 25 cc.) is added to the aqueous solution of the methanesulphonate obtained and the base extracted four times with methylene chloride (250 cc. total). The organic solution is chromatographed through alumina (200 g.) in a column (2.5 cm. diameter; 50 cm. height) and eluted with methylene chloride (1700 cc.). The solvent is removed on a water-bath giving an oily base (18 g.) which is then dissolved in boiling ethanol (75 cc.) and decolourised by the addition of charcoal (0.5 g.). A solution of anhydrous oxalic acid (14 g.) in ethanol (100 cc.) is added to the filtered solution. Precipitation is immediate and the product is collected, washed with ethanol (100 cc.) and dried at 20° C./0.2 mm. Hg for 20 hours, giving 1-[2-(7-chloro - 4 - quinolyl)aminopropyl] - 4 - (2-di-isobutylaminoethyl)piperazine tetraoxalate (27.7 g.), M.P. 160°–162° C.

The 1-(2-di-isobutylaminoethyl)piperazine (B.P. 160–163° C./0.4 mm. Hg) used in this preparation is prepared by the debenzylation of 1-(2-di-isobutylaminoethyl)-4-benzylpiperazine (19.6 g.) (B.P. 166° C.–168° C./0.5 mm. Hg), itself obtained by the condensation of di-isobutylamine (15.4 g.) with 1-(2-methanesulphonyloxyethyl)-4-benzylpiperazine (17.8 g.) in solution in benzene. The hydrochloride (22.6 g.) (M.P. 205° C.) of the latter compound, which is used in the preparation of the base, is obtained by reaction of methanesulphonyl chloride (11.1 g.) with 1-(2-hydroxyethyl)-4-benzylpiperazine (17.6 g.) (B.P. 135° C./0.2 mm. Hg), prepared according to W. S. Ide, J. Amer. Chem. Soc. 76, 1122 (1954).

*Example XVI*

A mixture of 4-(2-chloro - 1 - methylethyl)amino-7-chloroquinoline (12.5 g.), 1-(2-didodecylaminoethyl) piperazine (23 g.), anhydrous triethylamine (5 g.), sodium iodide (7.4 g.) and methyl ethyl ketone (150 cc.) is heated under reflux for 7 hours. Proceeding as in Example XV but chromatographing through alumina (330 g.) in a column (4 cm. diameter; 100 cm. height) and eluting with methylene chloride (1900 cc.), the purified base (25 g.) is obtained which is then dissolved in ethanol (150 cc.). Hydrobromic acid ($d=1.78$; 10 cc.) is added to the solution and the hydrobromide precipitated by the addition of acetone (400 cc.). The product is collected, washed with acetone (200 cc.) and dried at 20° C./0.2 mm. Hg for 20 hours, giving 1-[2-(7-chloro-4-quinolyl)aminopropyl] - 4 - (2 - didodecylaminoethyl) piperazine tetrahydrobromide (29 g.), M.P. 244–246° C.

The 1-(2-didodecylaminoethyl)piperazine (N percent found: 8.90; calculated: 9.02) used in this preparation is prepared by the debenzylation of 1-(2-didodecylaminoethyl)-4-benzylpiperazine (N percent found: 7.62; calculated: 7.55) (28.5 g.), itself obtained by the condensation of didodecylamine (34.6 g.) with 1-(2-methanesulphonyloxyethyl)-4-benzylpiperazine (29.8 g.) prepared as described in Example XV.

*Example XVII*

A mixture of 1-(2-hexamethyleneiminoethyl)-4-(2-aminopropyl)piperazine (35 g.), 4,7-dichloroquinoline (25.8 g.) and phenol (37 g.) is heated at 150° C. for 2 hours. After cooling to about 100° C., a solution of sodium hydroxide ($d=1.33$; 60 cc.) and distilled water (250 cc.) is added and the base extracted three times with chloroform (250 cc. total). The chloroform solution is extracted, first with a solution of pure methanesulphonic acid (50 g.) in distilled water (150 cc.) and then with distilled water (100 cc.). Sodium hydroxide solution ($d=1.33$; 60 cc.) is then added to the aqueous solution of the methanesulphonate obtained, and the solution extracted three times with methylene chloride (300 cc. total). The solvent is removed on a water-bath under reduced pressure (20 mm. Hg) and the residue taken up in boiling acetonitrile (75 cc.). The product is collected, washed with acetonitrile (15 cc.) and dried at 20° C./20 mm. Hg for 15 hours, giving the base (19 g.), M.P. 120–122° C., which is then redissolved in boiling acetonitrile (75 cc.), treated with charcoal (0.5 g.) and filtered hot. After cooling, the crystals are collected, washed with acetonitrile (30 cc.) and dried at 40° C./0.2 mm. Hg for 5 hours, giving 1[2-(7-chloro-4-quinolyl)aminopropyl]-4-(2-hexamethyleneiminoethyl)piperazine (17 g.), M.P. 122–124° C.

The 1-(2-hexamethyleneiminoethyl)-4-(2-aminopropyl) piperazine (B.P. 152–156° C./0.2 mm. Hg) used in this preparation is obtained by reductive amination of 1-(2-hexamethyleneiminoethyl) - 4 - (2-oxo-propyl)piperazine (N percent found: 15.2; calculated: 15.7) (59 g.), itself prepared from monochloroacetone (39.5 g.) and 1-(2-hexamethyleneiminoethyl)piperazine (N percent found: 19.3; calculated: 19.9) (48.5 g.), the latter compound being obtained by the condensation of anhydrous piperazine (116 g.) with 1-chloro-2-hexamethyleneiminoethane hydrochloride (71.5 g.), M.P. 210–212° C.

*Example XVIII*

A mixture of 1-[2-(7-chloro-4-quinolyl)aminopropyl]-piperazine (30.5 g.), 1-(2-chloroethyl)-4-ethoxycarbonylpiperazine hydrochloride (28.5 g.), sodium carbonate (26.5 g.), sodium iodide (15 g.) and ethanol (800 cc.) is heated under reflux for 8 hours. On termination of the heating, the solvent is removed on a water-bath under reduced pressure (20 mm. Hg), distilled water (200 cc.) and sodium hydroxide solution ($d=1.33$; 10 cc.) added to the residue obtained, and the mixture extracted three times with methylene chloride (350 cc. total). The organic solution is treated with a solution of hydrochloric acid ($d=1.19$; 30 cc.) in distilled water (200 cc.), followed by distilled water (100 cc.). Sodium hydroxide solution ($d=1.33$; 50 cc.) is added to the aqueous solution of the hydrochloride and the base extracted three times with methylene chloride (400 cc. total). After drying over sodium sulphate (10 g.), filtering, and removing the solvent on a water-bath, the dry residue obtained (60.5 g.) is dissolved in boiling acetonitrile (250 cc.). After cooling, the product is collected, washed with acetonitrile (100 cc.) and dried at 50° C./0.2 mm. Hg for 16 hours, giving 1-[2-(7-chloro-4-quinolyl)aminopropyl] - 4 - [2 - (4 - ethoxycarbonyl - 1 - piperazinyl)-ethyl]piperazine (29 g.), M.P. 144–145° C.

The 1-(2-chloroethyl)-4-ethoxycarbonylpiperazine hydrochloride (M.P. about 195° C.) used in this preparation is prepared by the chlorination, by means of thionyl chloride (36.5 g.), of 1-(2-hydroxyethyl)-4-ethoxycarbonylpiperazine (B.P. 127–131° C./0.4 mm. Hg) (56 g.), itself obtained by the condensation of glycol chlorohydrin (56.5 g.) with 1 - ethoxycarbonylpiperazine (106 g.).

*Example XIX*

A mixture of 1-[2-(7-chloro-4-quinolyl)aminopropyl]-piperazine (91.5 g.), 1-(2-chloroethyl)-4-acetylpiperazine hydrochloride (75 g.), sodium carbonate (79.5 g.), sodium iodide (45 g.) and ethanol (1200 cc.) is heated under reflux for 9 hours. The solvent is then removed on a water-bath under reduced pressure (20 mm. Hg), the residue obtained taken up in distilled water (750 cc.) and sodium hydroxide solution ($d=1.33$; 10 cc.) and the base extracted three times with methylene chloride (900 cc. total). The organic solution is treated with a solution of methanesulphonic acid (144 g.) in distilled water (700 cc.) followed by distilled water (400 cc.). The combined aqueous extracts are treated with sodium hydroxide solution ($d=1.33$; 200 cc.) and the base extracted three times with methylene chloride (700 cc.). The solvent is removed on a water-bath giving a yellow oil (145 g.) which is then dissolved in boiling acetonitrile (250 cc.), treated with charcoal (5 g.) and filtered hot. After cooling, the product is collected, washed with acetonitrile (50 cc. total) and dried at 40° C./0.2 mm. Hg for 16 hours, giving 1-[2-(7-chloro-4-quinolyl)aminopropyl]-4-[2 - (4 - acetyl - 1 - piperazinyl)ethyl]piperazine (85 g.), M.P. 134–136° C.

The 1-(2-chloroethyl)-4-acetylpiperazine hydrochloride (M.P. 238–240° C.) used in this preparation is obtained from thionyl chloride (51 g.) and 1-(2-hydroxyethyl)-4-acetylpiperazine (B.P. 135° C.–137° C./0.2 mm. Hg) (61 g.).

*Example XX*

Triethylamine (5 g.) is added to a suspension of 1-(2-chloroethyl)-4-phenylpiperidine hydrochloride (6.5 g.) in methyl ethyl ketone (50 cc.). After stirring for 5 minutes, sodium iodide (3.75 g.) and 1-[2-(7-chloro-4-quinolyl)aminopropyl]piperazine (7.62 g.) are added, followed by methyl ethyl ketone (50 cc.). The mixture is heated under reflux for 12 hours. After cooling, insoluble material is filtered off and washed with methyl ethyl ketone (45 cc. total). The combined filtrate and washing are evaporated to dryness under reduced pressure (25 mm. Hg). The residue is dissolved in methylene chloride (200 cc.) and the solution obtained washed with water (200 cc. total). The organic solution is dried over sodium sulphate, filtered, and the solvent removed under reduced pressure (25 mm. Hg). The gummy residue (12.5 g.) is crystallised from acetonitrile (80 cc.) giving, after filtering, washing and drying, a crude product (10 g.), M.P. about 160–165° C.

The crude product (19 g.), obtained as described above, is taken up in methylene chloride (500 cc.) After filtration to remove insoluble material, which is washed with methylene chloride (100 cc.), the solution obtained is chromatographed through alumina (200 g.) in a column (38 mm. diameter; 19 cm. height) and eluted with methylene chloride (2500 cc.). The dry residue obtained by removal of the solvent from the eluate is a white solid (11 g.), which is then recrystallized from methyl ethyl ketone (150 cc.) giving 1-[2-(7-chloro-4-quinolyl)aminopropyl] - 4 - [2 - (4 - phenyl - 1 - piperidinyl)ethyl]-piperazine (8 g.), M.P. 169° C.

The 1 - (2 - chloroethyl) - 4 - phenylpiperidinehydrochloride required for this preparation is prepared by the chlorination of 1-(2-hydroxyethyl)-4-phenylpiperidine obtained according to N. J. Leonard and W. K. Musker, J. Amer. Chem. Soc., 82, 5148 (1960).

*Example XXI*

A mixture of 1-[2-(1-1,2,3,4-tetrahydroquinolyl)ethyl]piperazine (38 g.), dry sodium iodide (24 g.), 4-(2-chloro - 1 - methylethyl)amino - 7 - chloroquinoline (41 g.) anhydrous triethylamine (16.2 g.) and methyl ethyl ketone (200 cc.) is heated under reflux, with stirring, for 8 hours. After cooling, insoluble material is filtered off and washed with methyl ethyl ketone (50 cc.). The combined filtrate and washings are evaporated to dryness on a water-bath under reduced pressure (20 mm. Hg). The residue obtained is dissolved in methylene chloride (500 cc.), washed with distilled water (2 x 200 cc.) and the organic layer extracted with a solution of pure methanesulphonic acid (43 g.) in distilled water (300 cc.). The solution of the methanesulphonate is made alkaline with sodium hydroxide solution ($d=1.33$; 50 cc.). The base is extracted with methylene chloride (300 cc.), chromatographed through alumina (400 g.) in a column (3.5 cm. diameter; 50 cm. height) and eluted with methylene chloride (1000 cc.). The solvent of the eluate is removed on a water-bath and the residue obtained dissolved in acetonitrile (250 cc.). The product is collected and washed with acetonitrile (50 cc.). The damp product is dissolved in boiling ethyl acetate (170 cc.). After cooling, the product is collected, washed with ethyl acetate (30 cc.) and dried at 50° C./0.05 mm. Hg for 18 hours, giving 1-[2-(7-chloro-4-quinolyl)aminopropyl]-4-[2 - (1-1,2,3,4 - tetrahydroquinolyl)ethyl]piperazine (35 g.), M.P. 137° C.

The 1 - [2 - (1-1,2,3,4 - tetrahydroquinolyl)ethyl]-piperazine (dihydrochloride, M.P. 240–242° C.) used in this preparation is obtained from 1-[2-(1-1,2,3,4-tetrahydroquinolyl)ethyl]-4-benzylpiperazine (67 g.) (dihydrochloride, M.P. 242–244° C.), itself obtained from 1-(2-methanesulphonyloxyethyl) - 4 - benzylpiperazine (130 g.), prepared as indicated in Example XV.

*Example XXII*

A mixture of 4-(2-chloro-1-methylethyl)amino-7-chloro-quinoline (30.6 g.), 1-(4-methyl-1-piperazinyl)-2-

(1-piperazinyl)-ethane tetrahydrochloride (44 g.), anhydrous triethylamine (60.6 g.), sodium iodide (18 g.) and methyl ethyl ketone (300 cc.) is heated under reflux for 24 hours. The solvent is removed on a water-bath under reduced pressure (20 mm. Hg), the residue treated with distilled water (300 cc.) and sodium hydroxide solution (d=1.33; 80 cc.), and the crude base extracted three times with methylene chloride (400 cc. total). The organic solution is then extracted with a solution of pure methanesulphonic acid (58 g.) and distilled water (400 cc.) followed by distilled water (200 cc.). Sodium hydroxide solution (d=1.33; 100 cc.) is then added to the combined aqueous extracts and the base extracted with methylene chloride (500 cc. total). The solvent is removed on a water-bath and the residue obtained (34 g.) taken up in boiling acetonitrile (80 cc.). After cooling, the crystals are collected, washed with acetonitrile (20 cc.) and redissolved without drying in boiling acetonitrile (180 cc.) After cooling, the product is collected, washed with acetonitrile (300 cc.) and dried at 40° C./0.2 mm. Hg. The base obtained (17.4 g.) is dissolved in ethanol (150 cc.) and hydrobromic acid (d=1.178; 16 cc.) added. After stirring for 5 hours, the product is collected, washed with ethanol (50 cc.) and dried at 20° C./0.2 mm. Hg, giving the pentahydrobromide (32 g.), M.P. about 260° C., which is then dissolved in distilled water (240 cc.), made alkaline with sodium hydroxide solution (d=1.33; 50 cc.) and the base extracted with methylene chloride (160 cc. total). The solvent is removed on a water-bath and the dry residue (20 g.) taken up in boiling acetonitrile (200 cc.). After cooling, the product is collected, washed with acetonitrile (60 cc.) and dried at 40° C./0.2 mm. Hg for 16 hours, giving 1-[2-(7-chloro-4-quinolyl)aminopropyl] - 4 - [2 - (4 - methyl - 1-piperazinyl)ethyl] piperazine (15.2 g.), M.P. 154–156° C.

*Example XXIII*

A mixture of 4-(2-chloro-1-methylethyl)amino-7-chloro-quinoline (19.1 g.), 1-(2-N-ethyl-N-ethoxycarbonylaminoethyl)piperazine (17 g.), dry sodium iodide (11.3 g.), anhydrous triethylamine (7.55 g.) and methyl ethyl ketone (150 cc.) is heated with stirring for 10 hours at 100–105° C. After cooling, the mineral salts are filtered off, washed with methyl ethyl ketone (50 cc.) and the combined filtrate and washings evaporated to dryness on a water-bath. The dry residue is taken up in methylene chloride (200 cc.) and stirred with distilled water (100 cc.). The organic solution is dried over sodium sulphate (10 g.), filtered, chromatographed through alumina (300 g.) in a column (3.5 cm. diameter; 40 cm. height) and eluted with methylene chloride (300 cc.) added. The crystalline precipitate of the hydro- on a water-bath. The oily residue (21 g.) is dissolved in acetone (300 cc.) and hydrochloric acid (d=1.19; 10.2 cc.) added. The crystalline precipitate of the hydrochloride is collected, washed with acetone (50 cc.) and dried in vacuo (0.1 mm. Hg) over sulphuric acid giving the hydrochloride (20 g.) which is dissolved in distilled water (80 cc.) and made alkaline with sodium hydroxide solution (d=1.33; 20 cc.). The base is extracted with methylene chloride (200 cc.), dried over sodium sulphate (5 g.) and filtered. The solvent is removed on a water-bath under reduced pressure (20 mm. Hg) and the base obtained dissolved in boiling di-isopropyl ether (60 cc.). After cooling and standing for 2 hours in a refrigerator, the product is collected, washed with di-isopropyl ether (20 cc.) and dried at 55° C./0.1 mm. Hg for 18 hours, giving 1-[2 - (7 - chloro-4-quinolyl)aminopropyl]-4-(2-N-ethyl-N-ethoxycarbonylaminoethyl)piperazine (11 g.), M.P. 90° C.

The 1-(2-N-ethyl-N-ethoxycarbonylaminoethyl)piperazine (N percent found: 11.75; calculated: 12.21) used as starting material in this preparation is obtained from 1-(2- N-ethyl-N - ethoxy - carbonylaminoethyl)-4-benzylpiperazine (N percent found: 8.60; calculated: 8.76) (28 g.), itself obtained from ethyl chloroformate (11.9 g.) and 1-benzyl-4-(2-ethylaminoethyl)piperazine (B.P. 127–130° C./0.5 mm. Hg) (25 g.). The latter compound is prepared from 1-(2-methanesulphonyloxyethyl)-4-benzylpiperazine dihydrochloride (M.P. 205° C.) (79 g.), prepared as described in Example XV, and monethylamine (50 g.).

*Example XXIV*

1-[2 - (7 - chloro - 4 - quinolyl)aminopropyl]-4-(2-N-ethyl-N-ethoxycarbonylaminoethyl)piperazine (prepared as described in Example XXIII) (39.5 g.) is heated under reflux for 40 hours in a solution of hydrochloric acid (d=1.19; 250 cc.) and distilled water (250 cc.). The water is removed under reduced pressure (20 mm. Hg) on a water-bath and the residue obtained dissolved in distilled water (200 cc.) and made alkaline with sodium hydroxide solution (d=1.33; 50 cc.). The base is twice extracted with methylene chloride (300 cc. total) and the organic solution chromotagraphed through alumina (200 g.) in a column (3.5 cm. diameter; 27 cm. height) and eluted with methylene chloride (250 cc.). The solvent is removed from the combined eluates on a water-bath and the residue obtained dissolved in boiling ethyl acetate (150 cc.). After cooling, the product is collected, washed with ethyl acetate (30 cc.) and dried at 50° C./0.1 mm. Hg for 12 hours, giving 1-[2-(7-chloro-4-quinolyl)aminopropyl]-4-(2-ethylaminoethyl)piperazine (19.5 g.), M.P. 128° C.

*Example XXV*

1 - [2 - (7 - chloro - 4 - quinolyl)aminopropyl] - 4 - (2-phthalimidoethyl)piperazine (prepared as described in Example XIV) (20 g.) is heated for 24 hours under reflux in hydrochloric acid (d=1.09; 300 cc.). After cooling, the precipitate of phthalic acid is removed and the filtrate evaporated to dryness on a water-bath under reduced pressure (20 mm. Hg). The dry residue obtained is dissolved in methanol (100 cc.). After 18 hours, the crystalline precipitate is collected, washed with methanol (20 cc.) and dried at 60° C./0.05 mm. Hg for 16 hours, giving 1-[2-(7-chloro-4-quinolyl)aminopropyl] - 4 - (2 - aminoethyl)piperazine tetrahydrochloride (20 g.), M.P. 255–260° C.

*Example XXVI*

1-[2-(7 - chloro - 4 - quinolyl)aminopropyl]-4-[2-(4-acetyl-1-piperazine)ethyl]piperazine (prepared as described in Example XIX) (58.5 g.) is heated under reflux for 24 hours in a solution of hydrochloric acid (d=1.19; 200 cc.) and distilled water (200 cc.). After cooling, charcoal (5 g.) is added, filtered, and the filtrate made alkaline with sodium hydroxide solution (d=1.33; 500 cc.). The base is extracted with methylene chloride (400 cc. total) and the solvent removed on a water-bath. The residue (49.9 g.) is taken up in acetonitrile (120 cc.). After cooling, the crystals formed are collected, washed with acetonitrile (40 cc.) and dried at 40° C./0.2 mm. Hg for 20 hours, giving 1-[2-(7-chloro-4-quinolyl)aminopropyl] - 4 - [2 - (7-piperazinyl)ethyl]piperazine (43 g.), 130–132° C.

*Example XXVII*

A solution of potassium cyanate (7.5 g.) in distilled water (40 cc.) is added, with stirring, to a solution of 1-[2-(7-chloro - 4 - quinolyl)aminopropyl] - 4 - [2 - (1-piperazinyl)ethyl]piperazine (32 g.) (prepared as described in Example XXVI) in N hydrochloric acid (300 cc.). After 5 hours at laboratory temperature, sodium hydroxide solution (d=1.33; 120 cc.) is added and the mixture extracted three times with chloroform (250 cc. total). The solvent is removed on a water-bath and the dry residue dissolved in boiling benzene (100 cc.). After cooling, the product is collected, washed with benzene (30 cc.) and dried at 45° C./0.2 mm. Hg for 16 hours, giving a product (24.7 g.), M.P. 134–136° C., which is dissolved in boiling ethyl acetate (750 cc.). The product is collected, after cooling, washed with ethyl acetate (100 cc.) and dried at 90° C./0.02 mm. Hg for 20 hours, giving 1-[2 - (7 - chloro - 4 - quinolyl)aminopropyl] - 4 - [2 - (4-carbamoyl-1-piperazinyl)-ethyl]piperazine (17 g.), M.P. 130–132 C.

*Example XXVIII*

A solution of 1-[2-(7-chloro-4-quinolyl)aminopropyl]-4-[2-(1-piperidinyl)ethyl]piperazine (15 g.) in N hydrochloric acid (108 cc.) is poured over 20 minutes, with vigorous stirring, into a solution prepared from methylene bis-β-hydroxynaphthoic acid (21 g.), distilled water (100 cc.) and sodium hydroxide solution ($d=1.33$; 10.9 cc.). The precipitate obtained is collected, washed four times with distilled water (800 cc. total) and dried at 70° C./0.05 mm. Hg. for 18 hours, giving 1[2-(7-chloro-4-quinolyl)aminopropyl] - 4-[2-(1-piperidinyl)ethyl]piperazine methylene bis-β-hydroxynaphthoate (34.5 g.), M.P. 220–225° C.

The 1-[2-(7-chloro-4-quinolyl)aminopropyl]-4-[2-(1-piperidinyl)-ethyl] piperazine used in this preparation is prepared as described in Example I.

The present invention includes within its scope pharmaceutical compositions which comprise at least one of the compounds of general Formula I, or non-toxic acid addition salt thereof, in association with a pharmaceutically carrier or coating. In clinical practice the compounds of the present invention will normaly be administered orally, parenterally or rectally.

Solid compositions for oral administration include compressed tablets, pills, powders, and granules. In such solid compositions one or more of the active compounds is, or are, admixed with at least one inert diluent such as starch, sucrose or lactose. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavoring, perfuming and preserving agents. The compositions according to the invention, for oral administration, also include capsules of absorbable material such as gelatin containing one or more of the active substances with or without the addition of diluents or excipients.

Preparations according to the invention for parenteral administration, include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which may contain, in addition to the active substance, excipients such as cacoa butter or a suitable wax base.

The percentage of active ingredient in the compositions of the invention may be varied, it being necessary that it should constitute a proportion such that a suitable dosage shall be obtained. The dosage will depend upon the therapeutic effect sought, the route of administration, the length of treatment, and the species of animal. The dosages are generally between 1 and 25 mg. per kg. of animal weight. In human therapy the compositions should generally be administered so as to give to an adult, in the case of oral administration, 0.1 to 1.5 g. of active substance per day.

The following example illustrates pharmaceutical compositions according to the invention.

*Example XXIX*

Tablets are prepared, each having the following composition:

|  | Mg. |
|---|---|
| 1-[2-(7-chloro-4-quinolyl)aminopropyl]-4-[2-(1-piperidinyl)ethyl]piperazine | 200 |
| Starch | 155 |
| Colloidal silica | 30 |
| Magnesium stearate | 15 |

We claim:

1. 1-[2-(7 - chloro - 4-quinolyl)aminopropyl]-4-[2-(1-piperidinyl)ethyl]piperazine.

2. 1-[2-(7-chloro - 4-quinolyl)aminopropyl]-4 - (3-dimethylamino-2-methylpropyl)piperazine.

3. 1-[2-(7 - chloro-4 - quinolyl)aminopropyl]-4-[2-(1-piperidinyl)propyl]piperazine.

4. 1-[2-(7 - chloro-4 - quinolyl)aminopropyl]-4-[3-(1-piperidinyl)propyl]piperazine.

5. 1-[2-(7 - chloro-4 - quinolyl)aminopropyl]-4-[6-(1-piperidinyl)hexyl]piperazine.

6. 1-[2-(7-chloro-4-quinolyl)aminopropyl]-4-(2-di-isobutylaminoethyl)piperazine.

7. 1-[2-(7-chloro-4 - quinolyl)aminopropyl]-4-[2-hexamethyleneiminoethyl)piperazine.

8. A 4-aminoquinoline derivative of the formula:

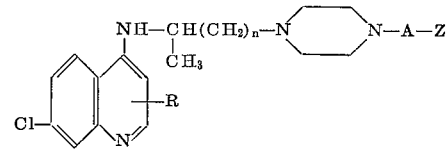

wherein R represents a member of the class consisting of hydrogen and alkyl containing at most 4 carbon atoms, $n$ represents an integer from 1 to 4 inclusive, A represents alkylene of 2 to 6 carbon atoms, and Z represents a member of the class consisting of amino, monoalkylamino, dialkylamino, N-alkoxy-carbonyl-N-alkylamino, the aforesaid alkyl radicals containing a maximum of 12 carbon atoms each, and nitrogen-containing heterocyclic groups attached through a nitrogen atom to the group A selected from 1-aziridinyl, 1-azetidinyl, 1-pyrrolidinyl, piperidino, morpholino, hexamethyleneimino, 1-piperazinyl, 1-piperazinyl substituted in the 4-position by a member of the class consisting of alkyl, alkanoyl, alkoxycarbonyl, carbamoyl, N-monoalkylcarbamoyl and N,N-dialkylcarbamoyl, phthalimido, and 1-1,2,3,4-tetrahydroquinolyl, and a said heterocyclic group carrying on one of its carbon atoms a member of the class consisting of alkyl, phenyl, halogenophenyl and alkylphenyl, each of the aforesaid alkyl, alkanoyl and alkoxy radicals attached to a said heterocyclic group containing at most 4 carbon atoms, and their non-toxic acid addition salts.

9. A non-toxic acid addition salt of 1-[2-(7-chloro-4 - quinolyl)aminopropyl]-4-[2-(1 - piperidinyl)ethyl]piperazine.

10. A non-toxic acid addition salt of 1-[2-(7-chloro-4 - quinolyl)aminopropyl]-4-(3-dimethylamino-2-methylpropyl)piperazine.

11. A non-toxic acid addition salt of 1-[2-(7-chloro-4 - quinolyl)aminopropyl]-4-[2-(1-piperidinyl)propyl]piperazine.

12. A non-toxic acid addition salt of 1-[2-(7-chloro- 4-quinolyl)aminopropyl]-4-[3-(1-piperidinyl)propyl]piperazine.

13. A non-toxic acid addition salt of 1-[2-(7-chloro-4-quinolyl)aminopropyl]-4-[6-(1-piperidinyl)hexyl]piperazine.

14. A non-toxic acid addition salt of 1-[2-(7-chloro-4-quinolyl)aminopropyl]-4-(2-di-isobutylaminoethyl)piperazine.

15. A non-toxic acid addition salt of 1-[2-(7-chloro-4-quinolyl)aminopropyl]-4-(2-hexamethyleneiminoethyl)piperazine.

References Cited by the Examiner

UNITED STATES PATENTS 3,126,384 3/1964 Gailliot et al. _____ 260—268
3,142,679 7/1964 Barrett et al. _____ 260—268

FOREIGN PATENTS 1,167,458 8/1958 France.
1,343,478 10/1963 France.

NICHOLAS S. RIZZO, *Primary Examiner.*